United States Patent [19]

Messing

[11] 3,915,804

[45] *Oct. 28, 1975

[54] APPARATUS AND METHOD FOR MEASURING CONDUCTIVITY CHANGE IN A UREA-UREASE REACTION

[75] Inventor: Ralph A. Messing, Horseheads, N.Y.

[73] Assignee: Corning Glass Works, Corning, N.Y.

[ * ] Notice: The portion of the term of this patent subsequent to Oct. 1, 1991, has been disclaimed.

[22] Filed: July 15, 1974

[21] Appl. No.: 488,224

[52] U.S. Cl............ 195/103.5 R; 195/127; 195/63; 195/DIG. 11
[51] Int. Cl.².......................................... C12K 1/04
[58] Field of Search...... 195/103.5 C, 103.5 R, 127, 195/DIG. 11

[56] References Cited
UNITED STATES PATENTS 3,839,154  10/1974  Messing................. 195/63

Primary Examiner—Alvin E. Tanenholtz
Assistant Examiner—C. A. Fan
Attorney, Agent, or Firm—James A. Giblin; Clinton S. Janes, Jr.; Clarence R. Patty, Jr.

[57] ABSTRACT

Changes in the electrical conductivity of a solution containing the reaction products of a urea-urease reaction can be continuously monitored without interference from the enzyme by passing a urea solution through a column containing urease immobilized on and within porous inorganic carrier materials, measuring the conductivity of the solution after passage through the column, and comparing that conductivity with the conductivity of the urea solution before passage through the column or the conductivity of a standard urea solution.

5 Claims, 2 Drawing Figures

DIFFERENTIAL CONDUCTIVITY
RECORDING USING IMMOBILIZED
UREASE

APPARATUS AND METHOD FOR MEASURING CONDUCTIVITY CHANGE IN A UREA-UREASE REACTION

RELATED APPLICATIONS

Patent Application Ser. No. 332,807, filed Feb. 16, 1973, entitled "Enzymes Immobilized on Porous Inorganic Support Materials", now U.S. Pat. No. 3,850,751, and Patent Application Ser. No. 390,005, filed Aug. 20, 1973, entitled "Apparatus and Method for Measuring Conductivity Change in A Glucose-Glucose Oxidase Reaction", now U.S. Pat. No. 3,839,154, both filed in the name of R. A. Messing and assigned to the present assignee.

BACKGROUND OF THE INVENTION

1. Field

This invention relates generally to an apparatus which measures the difference in electrical conductivity between two solutions, one of the solutions containing the products of an enzymatic reaction. Specifically, the invention relates to an apparatus and method for continuously monitoring conductivity changes attributable to a urea-urease reaction in which the urease is immobilized within porous inorganic carriers and kept separate from the solution of reaction products.

2. Prior Art

It is well know that changes in the electrical conductivity of an ionic reaction solution can be used for quantitative chemical determinations. In an enzymesubstrate reaction, such observed changes in electrical conductivity can be used to quantitate substrate concentration or enzyme activity. See, for example, U.S. Pat. No. 3,421,982 issued to Schultz et al. on Jan. 14, 1969.

A more recent method of using conductivity changes to measure the concentration of a substrate in an enzymesubstrate reaction is disclosed in U.S. Pat. No. 3,635,681 issued to Rogers on Jan. 18, 1972. That method is based on the use of "differential conductivity" measurements. Whereas past conductivity measurements required only one set of electrodes to measure the conductivity of an ionic solution, differential conductivity measurements require the use of two sets of electrodes, such that the difference in conductivity between a reaction medium and a "standard" medium can be used to determine concentrations. Differential conductivity measurements permit the subtraction of background conductivity (in an ionic medium containing the substance to be detected) from the measured change in conductivity caused by a chemical reaction between an enzyme and a substrate to be detected or measured. In the above-cited patent, there is disclosed a differential conductivity apparatus having two sets of electrodes or two probes, each having a set of electrodes. One such probe has associated therewith and between each of the electrodes a matrix means containing a "test reagent" such as an enzyme fixed to or immobilized on or within the matrix. In using such a probe, the enzyme is not kept separate from the ionic medium wherein the conductivity is being measured.

I have now found that differential conductivity can be used to measure minute changes in the electrical conductivity of a solution containing the products of urea-urease reaction without the necessity of having the enzyme present in the medium containing the reaction products. My apparatus is relatively simple to prepare and use and does not require the use of any specially prepared probes. The apparatus and method for using it are described in detail herein.

SUMMARY OF THE INVENTION

My apparatus for continuously monitoring the electrical conductivity of a solution containing the reaction products of a urea-urease reaction comprises, in combination, first and second flow-through conductivity cells, each cell having a chamber through which an ionic solution can flow and a pair of electrodes exposed to the chamber and adapted to measure the electrical conductivity of an ionic solution within the chamber; a flow-through container such as a plug flow-through column containing composites of urease immobilized within the pores of porous, essentially water-insoluble inorganic carrier particles having an average pore diameter between about 140 A and 985 A and an average particle size between about 25 and 80 mesh, U.S. Standard Sieve; means for introducing a urea-containing solution into the container and means for collecting the solution after passage through the container and passing the collected solution through the first flow-through conductivity cell; means for measuring the electrical conductivity of a solution within the first cell; means for passing either a standard urea solution (e.g., 6% by weight urea in water) or the urea solution prior to passage through the flow-through container through the second cell; means for measuring the electrical conductivity of either such solution within the second cell; and means for measuring the difference in electrical conductivities of solutions within the first and second cells. In a preferred embodiment, the flow-through container is a plug flow-through glass column containing composites of urease adsorbed within particles of porous titania carriers having an average pore diameter between about 300 A and 590 A and there is included a recorder electrically associated with the means for determining the differential conductivity of the contents of the first and second conductivity cells.

SPECIFIC EMBODIMENTS

A very important part of my apparatus for continuously monitoring changes in the conductivity of a solution containing the reaction products of a urea-urease reaction is the flow-through container and the immobilized urease composite contained therein. The immobilized enzyme composites are made in accordance with the directions in my copending patent application Ser. No. 332,807 filed on Feb. 16, 1973, and cited above as a related application. In that disclosure, incorporated herein by reference, it is pointed out that an extremely stable immobilized urease composite can be prepared by immobilizing urease within the pores of essentially water-insoluble inorganic carrier materials having an average pore diameter between about 140 A and 985 A, preferably between about 300 A and 590 A. As used herein, the term immobilized, or its equivalent, when applied to enzymes, refers to enzymes which have been bonded to the inorganic carrier surfaces in such a way that the enzymes retain their catalytic ability even though insoluble. Such enzymes can be immobilized by adsorption (U.S. Pat. No. 3,556,945), by covalent bonds (U.S. Pat. No. 3,519,538), and other means.

Urease hydrolyzes urea to measurable amounts of $NH_4^+$ and $HCO_3^-$ which can be related to urea concentration. Thus by immobilizing urease within the pores of the inorganic carriers, the composite can be used to hydrolyze an unknown amount of urea, and by continuously measuring changes in electrical conductivity caused by formation of the reaction products, the concentration (unknown) of the urea can be determined.

In the above-cited application (Ser. No. 332,807), it was shown that the average pore diameter of the porous inorganic carrier is very important for long term enzyme stability and high enzyme loading. Specifically, it was found that the average pore diameter should be at least as large as the enzyme molecule but less than about 1000 A. A preferred carrier material for the immobilized urease was porous titania particles of about 25 to 80 mesh having an average pore diameter of between about 140 A and 985 A. An especially preferred carrier consisted of porous titania particles of 25–60 mesh and an average pore diameter of 300 A to 590 A. The above-described preferred carrier was found especially useful in an example below although it should be appreciated that any of the carriers described in Ser. No. 332,807 as useful for an immobilized urease composite would also be useful.

Figure 1:
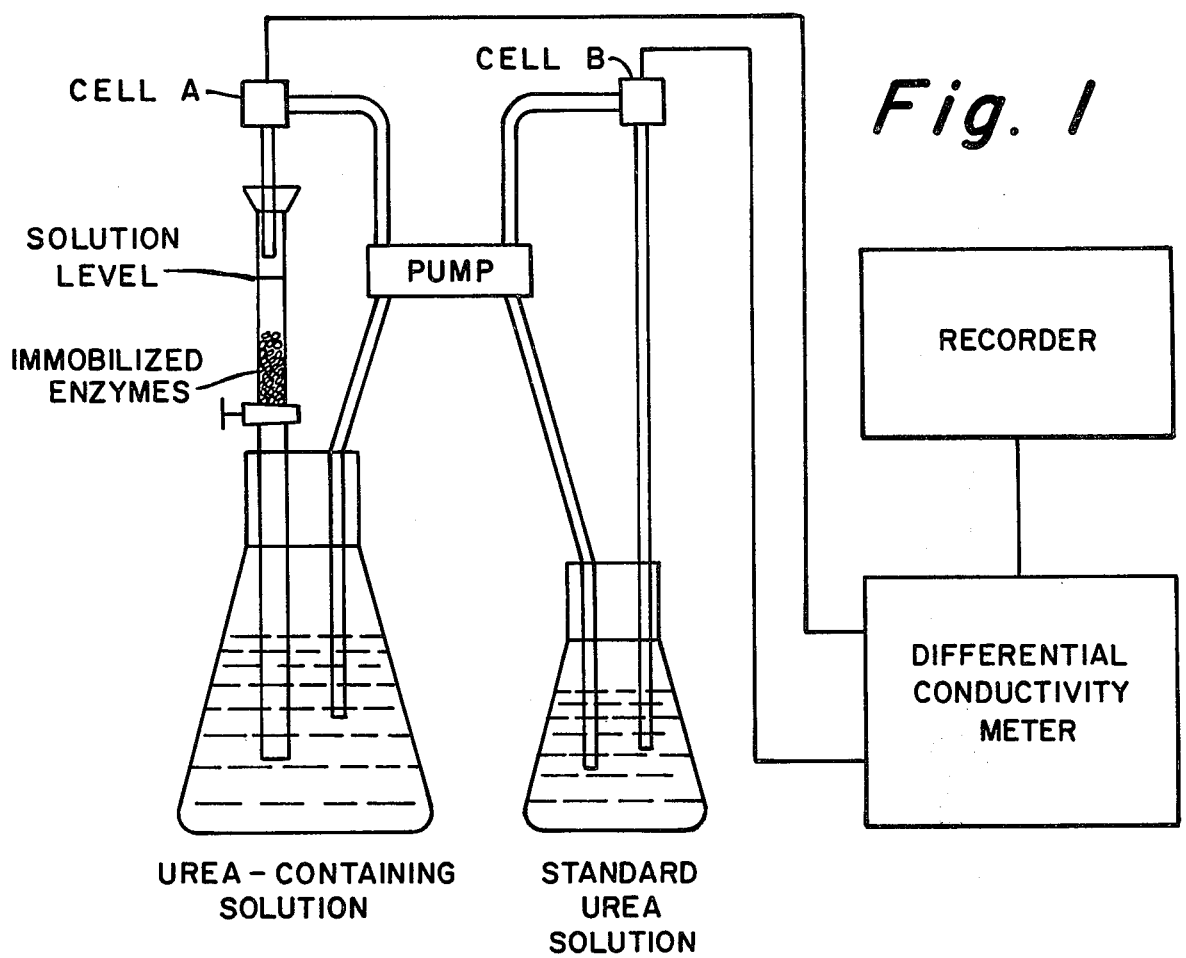
FIG. 1 is an illustrative diagram of the measuring apparatus in a preferred embodiment.

An illustrative diagram of the apparatus is shown in FIG. 1. There, it can be seen that a urea-containing solution can be continuously pumped from a flask and through a glass plug flow-through column containing the immobilized enzyme composite consisting of urease immobilized within the pores of porous inorganic carrier materials. The carrier should, of course, be essentially water-insoluble. In the specific apparatus illustrated in FIG. 1, the conductivity of the solution after passage through the column is measured by cell A which is a simple flow-through container having two electrodes electrically connected to a differential conductivity meter. Also connected to the differential conductivity meter is a second cell, cell B, also having two electrodes, which measure the conductivity of a standard urea solution (e.g., 1 molar) which is also continuously pumped through the conductivity cell. The differential conductivity meter indicates the conductivity change in the urea-containing solution (also containing reaction products) relative to the conductivity of the standard solution and this change can be continuously recorded on a conventional recorder as illustrated. These recordings can be used to determine the concentration of the urea-containing solution or the enzyme activity via standard curves prepared beforehand. The pumps shown in FIG. 1 (illustrated very generally by the designation "pump") can be conventional peristaltically functional pumps. The pumps themselves, however, are not absolutely necessary since the urea solution can be gravity-fed through the column and the conductivity change attributable to one pass through the column recorded, if desired.

Figure 2:
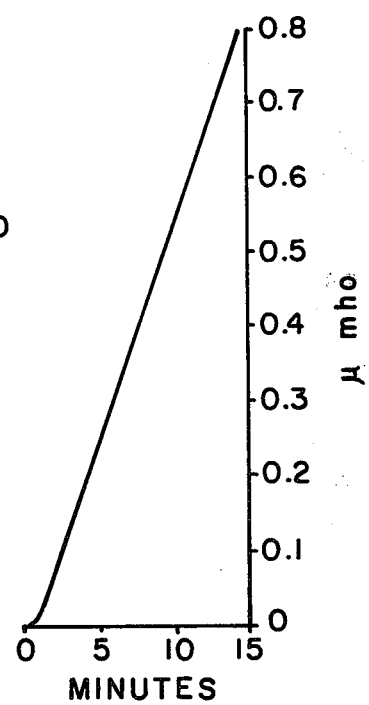
FIG. 2 is graph showing a typical differential conductivity recording of the conductivity changes of the reaction product solution with time in minutes.

FIG. 2 shows a typical differential conductivity recording developed by continuously circulating the urea-containing solution described below through a glass flow-through plugged column (described below) containing composites of urease adsorbed within the pores of my most preferred carrier, porous titania particles (25–80 mesh) having an average pore diameter of about 420 A. The actual preparation of the composites is described below.

Preparation and Use of Apparatus

Materials and Methods

The urease was a preparation available from Nutritional Biochemical Co. This preparation contained 400 Sumner Units (S.U.) of urease activity per gram. The differential conductivity meter was a Wescan Instruments, Inc. Model 211. Conductivity flow cells, illustrated as cells A and B in FIG. 1, were Model 219–020 conductivity flow cells, having a cell constant K = 80 and they were obtained from Wescan Instruments, Inc. A four-channel peristaltic pump was fitted with 1/16 inch I.D. Tygon tubing in two channels. The column used for the apparatus was a Corning Glass Works Code 442802 Teflon stopper, straight-bore stopcock, fitted with a fiber glass retainer just above the stopcock fittings. The O.D. of this column was 9 mm. The column length was approximately 11 cm. The Recorder illustrated in FIG. 1 was a Sargent Recorder, Model SRL.

Preparation of the Immobilized Enzyme Composites

Urease has a molecular weight of about 480,000 and a largest dimension of about 125 A when the enzyme exists as a monomer. If urease exists as a dimer, the largest dimension is about 250 A. Inasmuch as the substrate for urease, urea, is extremely small relative to the enzyme, consideration need not be given to the substrate size in making an initial determination of suitable average pore size range for the carrier. In the examples below, urease was bonded to porous alumina, porous titania, and porous alumina-titania carrier having the following characteristics:

TABLE I

| | POROUS CARRIERS | | | | |
|---|---|---|---|---|---|
| | $Al_2O_3$ | $Al_2O_3$-$TiO_2$ | $TiO_2$ | $TiO_2$ | $TiO_2$ |
| Average pore diameter (A) | 175 | 220 | 350 | 420 | 855 |
| Minimum pore diameter (A) | 140 | 140 | 220 | 300 | 725 |
| Maximum pore diameter (A) | 220 | 300 | 400 | 590 | 985 |
| Pore volume (cc/gm) | 0.6 | 0.5 | 0.45 | 0.4 | 0.22 |
| Surface area (m²/gm) | 100 | 77 | 48 | 35 | 9 |
| Particle mesh size | 25–60 | 25–60 | 25–60 | 30–80 25–80 | |

Specific directions for making the above carriers can be found in my copending patent application Ser. No. 344,964, filed Mar. 26, 1973, entitled "Method of Making Porous Inorganic Bodies," and assigned to the present assignee.

500 mg. samples of each of the above carriers were preconditioned by shaking the samples in 11 ml of 0.5 M sodium bicarbonated at 37°C for one hour and 40 minutes, after which the sodium bicarbonate solution was decanted. To each 500 mg sample of carrier was added 20 ml of 1% aqueous urease suspension which contained 400 Sumner Units of urease activity per gram or 80 S.U. per sample. The carrier samples and the urease solution were shaken in a water bath at 37° for 5 hours. The mixture was then allowed to stand at room temperature for 22 hours, after which the enzyme solution was decanted and the enzyme composites were washed successively with water, 0.5 M sodium chloride, and distilled water. The composites were then transferred to small columns where they were assayed at room temperature over a period of up to 32 days.

The Assay

The specific differential conductivity measurement conditions were as follows:

Temperature: 22°C (room temperature)
Standard Substrate Solution: 6% urea in distilled water (1 M urea)
Volume of Standard Substrate Solution: 10 ml
Volume of Reaction Mixture: 40 ml
Flow Rate: 390 ml/hr A conversion factor for conductivity units to Sumner Units was determined utilizing the conductivity meter with a recorder attached and a K = 80 cell. Various quantities of urease from 0.008 through 0.04 S.U. were added to a 10 ml volume of substrate solution which was circulating through a conductivity cell at a rate of 390 ml/hr. After the initial contribution due to the enzyme itself (approximately one minute interval), a linear slope developed for each level of enzyme. This slope in micromhos per minute was determined for each level of enzyme and a conversion factor was calculated. For this 10 ml volume, the conversion factor to Sumner Units was 77.7 micromhos per minute per S.U.

The activities of the immobilized enzymes described above were determined by circulating 40 ml of 1 M urea solution at 390 ml/hr through the columns containing the immobilized enzyme. The slope that developed was multiplied by 4 before utilizing the conversion factor because 40 ml of substrate solution was used in place of the 10 ml volume utilized to determine the conversion factor. The dilution corrected slope was then divided by 77.7 to determine the number of Sumner Units. The assays were performed at room temperature and the immobilized enzymes were stored in water at room temperature between assays over the half-life determination period. All immobilized enzyme samples were repetitively assayed. Results are shown in Table II.

TABLE II

ASSAYS (S.U.) OF ABOVE IMMOBILIZED ENZYMES HAVING CARRIERS OF VARYING AVG. PORE DIA. (A)

| Days | $Al_2O_3$ (175) | $Al_2O_3$-$TiO_2$ (220) | $TiO_2$ (350) | $TiO_2$ (420) | $TiO_2$ (855) |
| --- | --- | --- | --- | --- | --- |
| 0 | 0.35 | 0.81 | 1.18 | 4.36 | 2.46 |
| 0 | 0.22 | — | — | — | — |
| 1 | 0.11 | — | — | — | — |
| 4 | — | 0.59 | 0.63 | 2.32 | 1.77 |
| 5 | 0.05 | 0.45 | 0.43 | 1.98 | 0.95 |
| 6 | — | 0.06 | 0.33 | 1.98 | 0.61 |
| 7 | — | 0.05 | 0.29 | 1.56 | 0.36 |
| 11 | — | 0.03 | 0.16 | 1.11 | 0.19 |
| 18 | — | 0.03 | 0.11 | 0.73 | 0.09 |
| 27–28 | −0.01 | 0.07 | 0.47 | 0.03 | |
| 32 | — | — | 0.05 | 0.34 | — |

From the above table, it can be seen that the optimum average pore size for the porous ceramic for urease is about 420 A, while a smaller amount of enzymatic activity is retained with composites using carriers having an average pore of as low as 175 A or as high as 855 A. This would appear to indicate that the form of urease immobilized in these carriers are probably predominantly in the dimer form which has a major dimension of approximately 250 A.

Inasmuch as the described apparatus is subject to various modifications that will become apparent to those skilled in the art, it is intended that the scope of the described invention should be limited only by the appended claims.

I claim:

1. An apparatus for monitoring the electrical conductivity of a solution containing the products of a urea-urease reaction comprising in combination:

a. first and second flow-through cells, each cell having a chamber through which an ionic solution can flow and a pair of electrodes exposed to the chamber and adapted to measure the electrical conductivity of an ionic solution within the chamber;

b. a flow-through container containing an enzyme composite comprising urease immobilized within the pores of porous, essentially water-insoluble inorganic carrier particles having an average pore diameter between about 140 A and 985 A and an average particle size between about 25 and 80 mesh, U.S. Standard Sieve;

c. means for introducing a urea-containing solution into the container of (b) and means for collecting the solution after passage through the container of (b) and passing the collected solution through the first flow-through cell;

d. means for measuring the electrical conductivity of a solution within the first cell;

e. means for passing either a standard urea solution or the urea-containing solution prior to passage through the container of (b) through the second cell and measuring the electrical conductivity of either such solutions within the second cell; and, f. means for measuring the difference in electrical conductivity between the first and second cell.

2. The apparatus of claim 1 wherein the container of (b) is a plug flow-through column containing an enzyme composite of urease immobilized within the pores of porous titania particles having an average pore diameter between about 300 A and 590 A.

3. The apparatus of claim 1 wherein there is included recorder means electrically associated with the means for measuring the difference in conductivity between the first and second cells.

4. A method of monitoring the change in electrical conductivity of a solution which change is attributable to a urea-urease reaction which comprises the steps of:

a. passing a urea-containing solution through a flow-through container containing composites of urease immobilized within the pores of porous, essentially water-insoluble inorganic carrier particles having an average pore diameter between about 140 A and 985 A and an average particle size between about 25 and 80 mesh, U.S. Standard Sieve;

b. measuring the electrical conductivity of the solution after passage through the container; and c. determining the difference between that conductivity and that of a standard urea solution or the conductivity of the urea-containing solution prior to passage through the flow-through container.

5. The method of claim 4 wherein the flow-through container is a plug flow-through column containing composites of urease immobilized within the pores of porous titania particles having an average pore diameter of between about 300 A and 590 A.

* * * * *

UNITED STATES PATENT OFFICE
CERTIFICATE OF CORRECTION

PATENT NO. : 3,915,804
DATED : October 28, 1975
INVENTOR(S) : Ralph A. Messing

It is certified that error appears in the above-identified patent and that said Letters Patent are hereby corrected as shown below:

Column 1, line 32, "zymesubstrate" should be -- zyme-substrate --.

Column 1, line 39, "zymesubstrate" should be -- zyme-substrate --.

Column 4, Table I, column heading "TiO$_2$" second occurrence, remove last entry "25-80".

Column 4, Table I, column heading "TiO$_2$" last occurrence, enter -- 25-80 -- as last entry.

Column 5, Table II, column heading "Days 27-28" "-0.01, 0.07, 0.47, 0.03" should be -- -, 0.01, 0.07, 0.47, 0.03 --.

Signed and Sealed this fourth Day of May 1976

[SEAL]

Attest:

RUTH C. MASON
Attesting Officer

C. MARSHALL DANN
Commissioner of Patents and Trademarks